US011811612B2

(12) United States Patent
Fainberg et al.

(10) Patent No.: US 11,811,612 B2
(45) Date of Patent: *Nov. 7, 2023

(54) NETWORK VISIBILITY

(71) Applicant: FORESCOUT TECHNOLOGIES, INC., San Jose, CA (US)

(72) Inventors: Ilya Fainberg, Tel Aviv (IL); Anderson Lam, Fremont, CA (US); Mihael Sudakovitch, San Jose, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,652

(22) Filed: Jan. 21, 2022

(65) Prior Publication Data
US 2022/0150126 A1 May 12, 2022

Related U.S. Application Data

(63) Continuation of application No. 16/728,808, filed on Dec. 27, 2019, now Pat. No. 11,240,114, which is a
(Continued)

(51) Int. Cl.
*G06F 15/173* (2006.01)
*H04L 41/12* (2022.01)
(Continued)

(52) U.S. Cl.
CPC ............ *H04L 41/12* (2013.01); *H04L 41/069* (2013.01); *H04L 43/04* (2013.01); *H04L 43/10* (2013.01);
(Continued)

(58) Field of Classification Search
CPC ..... H04L 63/1408; H04L 41/16; H04L 43/08; H04L 43/12; H04L 63/08; H04L 63/10;
(Continued)

(56) References Cited

U.S. PATENT DOCUMENTS 7,593,351 B1 * 9/2009 Zioulas ................... H04L 43/00
709/224
7,672,283 B1 * 3/2010 Chang ................. H04W 12/122
370/346
(Continued)

OTHER PUBLICATIONS

Intl Search Report and Written Opinion of the ISA/EP in PCT/US2018/014480 dated Jun. 12, 2018; 12 pgs.
(Continued)

*Primary Examiner* — Dustin Nguyen
*Assistant Examiner* — Hao H Nguyen
(74) *Attorney, Agent, or Firm* — Womble Bond Dickinson (US) LLP

(57) ABSTRACT

Systems and methods for monitoring devices on a network are describes. An indication of one or more active devices coupled to a network at an end of a time interval is received. Network traffic data associated with the network is received and one or more additional devices coupled to the network during the time interval that were not included in the indication of the one or more active devices coupled to the network at the end of the time interval are determined based on the network traffic data.

20 Claims, 12 Drawing Sheets

Related U.S. Application Data continuation of application No. 15/420,471, filed on Jan. 31, 2017, now Pat. No. 10,560,336.

(51) Int. Cl.
| | | |
|---|---|---|
| *H04L 67/10* | (2022.01) | |
| *H04L 43/10* | (2022.01) | |
| *H04L 41/069* | (2022.01) | |
| *H04L 43/04* | (2022.01) | |
| *H04L 9/40* | (2022.01) | |
| *G06F 9/455* | (2018.01) | |

(52) U.S. Cl.
CPC .......... *H04L 63/1408* (2013.01); *H04L 67/10* (2013.01); *G06F 2009/45591* (2013.01)

(58) Field of Classification Search
CPC ... H04L 63/105; H04L 63/1433; H04L 63/20; G06F 11/1448; G06F 11/1464; G06F 17/30073; G06F 17/30233; G06F 17/30864; G06F 17/30991; G06F 2201/815; G06F 3/065; G06F 9/442; G06F 9/445; G06F 9/455; G06F 9/45558
See application file for complete search history.

(56) References Cited

U.S. PATENT DOCUMENTS

| | | | | |
|---|---|---|---|---|
| 8,639,800 | B2* | 1/2014 | Friedrich | H04L 63/10 709/224 |
| 2005/0278542 | A1* | 12/2005 | Pierson | H04L 63/0876 713/182 |
| 2006/0123133 | A1* | 6/2006 | Hrastar | H04L 63/1491 709/240 |
| 2010/0011094 | A1* | 1/2010 | Ver Steeg | H04L 63/107 709/220 |
| 2010/0106824 | A1* | 4/2010 | Friedrich | H04L 63/1408 709/224 |
| 2010/0162359 | A1* | 6/2010 | Casey | H04L 43/106 709/224 |
| 2010/0293148 | A1* | 11/2010 | Cesario | G06F 11/1451 707/E17.007 |
| 2012/0084262 | A1* | 4/2012 | Dwarampudi | G06F 11/1448 711/E12.001 |
| 2013/0137376 | A1* | 5/2013 | Fitzgerald | H04W 8/245 455/41.3 |
| 2015/0195176 | A1* | 7/2015 | Vasseur | H04L 43/12 709/224 |
| 2016/0226898 | A1* | 8/2016 | Mody | H04L 51/214 |
| 2017/0230451 | A1* | 8/2017 | Paramasivam | G06F 16/24573 |
| 2018/0096157 | A1* | 4/2018 | Israel | G06F 21/566 |
| 2018/0124807 | A1* | 5/2018 | Smith | H04W 74/0808 |
| 2018/0165431 | A1* | 6/2018 | Neumann | G06F 21/316 |
| 2018/0176254 | A1* | 6/2018 | Lam | H04L 63/105 |
| 2018/0184286 | A1 | 6/2018 | Patterson | |
| 2018/0359311 | A1* | 12/2018 | Paramasivam | H04L 67/025 |

OTHER PUBLICATIONS

Examination Report of the European Patent Convention for European Patent Application No. 18 714 639.4, dated Mar. 11, 2021, pp. 10.

Transmittal of International Preliminary Report on Patentability dated Aug. 6, 2019, for International Application No. PCT/US2018/014480, filed Jan. 19, 2018, pp. 10.

* cited by examiner

NETWORK VISIBILITY

CROSS-REFERENCE TO RELATED APPLICATION

This application is a continuation of U.S. patent application Ser. No. 16/728,808, filed Dec. 27, 2019, which is a continuation of U.S. patent application Ser. No. 15/420,471, filed Jan. 31, 2017, now U.S. Pat. No. 10,560,336, issued Feb. 11, 2020, the entire contents of which are hereby incorporated by reference.

TECHNICAL FIELD

Aspects and implementations of the present disclosure relate to network monitoring, and more specifically, to enhanced visibility of devices coupled to a network.

BACKGROUND

As technology advances, the number and variety of devices that are connected to communications networks are rapidly increasing. With the number and variety of devices increasing, the ability to determine which devices are connected to the network becomes important because machines that are unknown may have security vulnerabilities. These vulnerabilities may leave the network open to compromise or other risks. Understanding which devices are on a network can thus be useful for monitoring or securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
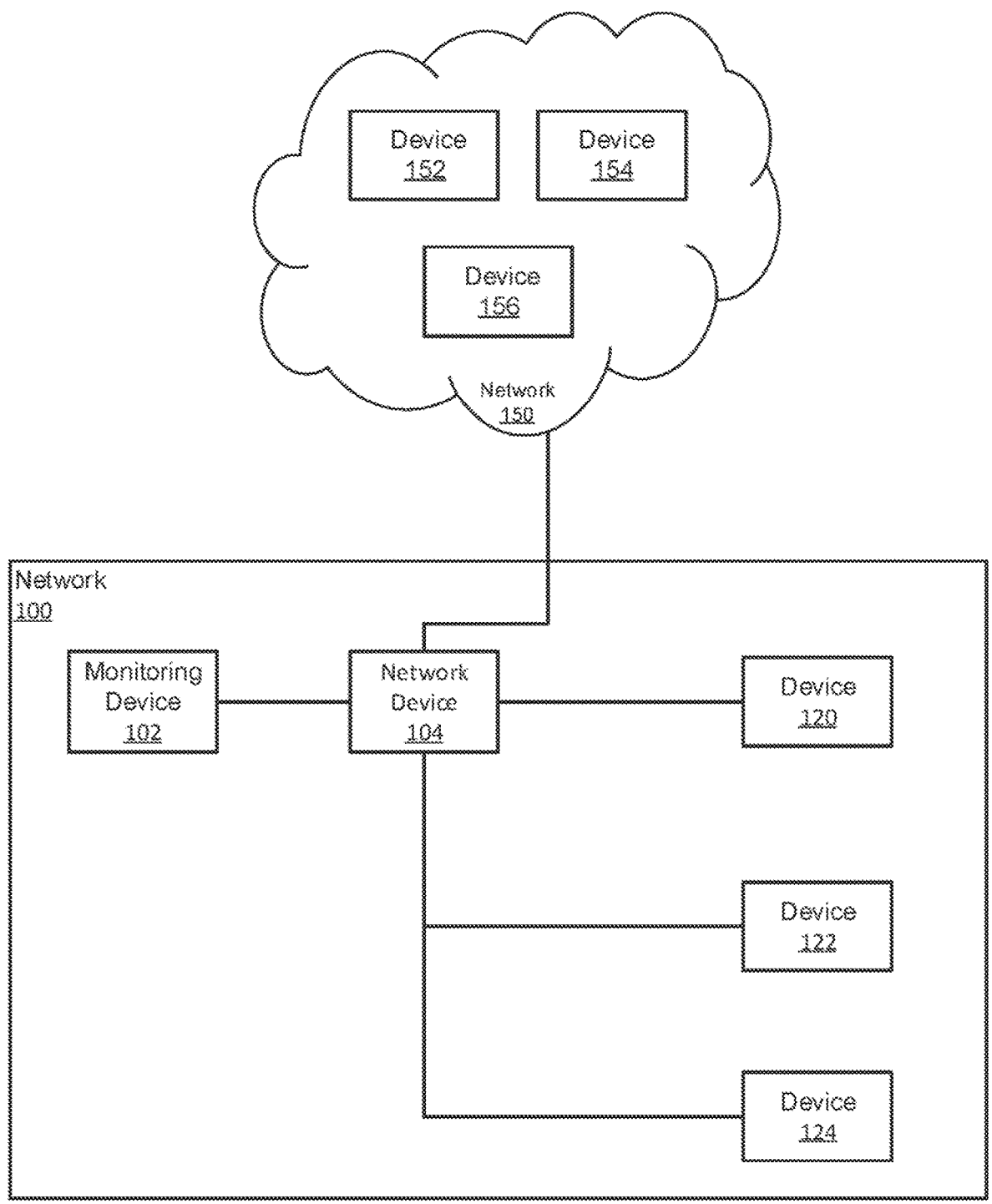
FIG. 1 depicts an illustrative diagram of one or more communication networks in accordance with one implementation of the present disclosure.

Aspects and implementations of the present disclosure are directed to device monitoring. The systems and methods disclosed can be employed with respect to network security and network management, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

Visibility and control into external or remote networks (e.g., infrastructure as a service (IaaS) and other clouds and data centers) becomes increasing important as companies move their infrastructure to remote networks and thus need the ability to see and manage the remote networks. The monitoring resources of the remote networks may not sufficient to see and manage devices on the remote networks. For example, accessing native cloud interfaces via a cloud provided application programming interface (API) may not present correct/accurate information, complete information, detailed information, or combination thereof of the resources in a cloud network. The cloud provided interface may not report short-lived devices that are spun up and spun down in between queries for device information. This results in incomplete information about the resources of the remote network.

As an exploit example, a malicious user or infected device may measure the time interval between resource queries made via a cloud API, and then spin up malicious devices for a short period of time, within the query interval, so that the malicious devices are not detected as part of the resource queries.

Accordingly, described herein in various implementations are systems, methods, techniques, and related technologies, which analyze network traffic data to accurately determine network resources. The network traffic data may further be analyzed in combination with network resource queries. The network traffic data may include a history of activated or spun-up devices from the moment the devices are activated. A device's network communication upon startup (e.g., DHCP discover requests) and shut-down (e.g., releasing an IP address lease) can allow using the network traffic data to better track network resources including short-lived devices or instances (e.g., virtual machines). Integrating this functionality into a network access control (NAC) product can allow control and remediation of possible malicious scenarios (e.g., block a device from being spun-up again) and notification of new or suspicious devices.

Accordingly, it can be appreciated that the described technologies are directed to and address specific technical challenges and longstanding deficiencies in multiple technical areas, including but not limited to network security, monitoring, accounting, and policy enforcement. It can be further appreciated that the described technologies provide specific, technical solutions to the referenced technical challenges and unmet needs in the referenced technical fields.

FIG. 1 depicts an illustrative diagram of one or more communication networks in accordance with one implementation of the present disclosure. The communication network 100 includes a monitoring device 102, a network device 104, and devices 120-124. The devices 120-124 and may be any of a variety of devices including, but not limited to, computing systems, laptops, virtual machines, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among monitoring device 102 and devices 120-124. Network device 104 may be one or more network switches, access points, routers, firewalls, hubs, etc. Monitoring device 102 may be communicatively coupled to the network device 104 in such a way as to receive network traffic flowing through the network device 104 (e.g., port mirroring).

Network device 104 is further configured to communicatively couple network 100 and network 150. Network 100 and network 150 may be communicatively coupled via one or more networks including the Internet.

Network 150 may be a remote network relative to network 100. The term remote network as used herein can include a cloud network or cloud computing network, a network at another or different location (e.g., campus or branch office), or a different network segment (e.g., different IP address range possibly associated with a management device as described herein). Network 150 includes devices 152-156. The devices 152-156 may be any of a variety of devices including, but not limited to, computing systems, laptops, virtual machines, smartphones, servers, Internet of Things (IoT) devices, etc. In some embodiments, the devices 152-156 may be virtual machines executing on a computing device (e.g., a server). It is noted that the devices of communication network 150 may communicate in a variety of ways including wired and wireless connections and may use one or more of a variety of protocols.

Monitoring device 102 may be configured for a variety of tasks including monitoring of devices on network 100 and network 150. Monitoring device 102 may be a computing system, a network device (e.g., router, firewall, access point), a network access control (NAC) device, an intrusion prevention system (IPS), an intrusion detection system (IDS), a deception device, a cloud-based device, a virtual machine based system, etc.

Monitoring device 102 may be configured to monitor which devices are active (e.g., currently running) and non-active (e.g., in a sleep state, a suspended state, a low power state, a powered down state, or a released state for virtual machines). Monitoring device 102 may be able to request or receive (e.g., via an event) device data indicating which devices are active on network 150, e.g., from a cloud management system, a server, a hypervisor, a NAC device, or other device coupled network 150. The data associated with active devices may be requested or received on a periodic basis (e.g., at 8, 16, or 24 hour intervals). The data associated with the active devices may not include information on non-active devices because the management system or device providing the data on active devices may not be aware or have data on the non-active devices. In some cases, the resources (e.g., a cloud management system, a server, a hypervisor, a NAC device, or other device coupled network 150) of network 150 may not provide a convenient manner to allow monitoring device 102 to request or receive the device data.

Monitoring device 102 may further be configured to request or receive (e.g., via an event) network traffic data (e.g., logs) associated with network 150. The network traffic data may be from a switch or router (e.g., physical or software based network devices) or from a service or management devices that monitors traffic on network 150. The requests for data of which devices are active and network traffic data may be made via an application programming interface (API).

Monitoring device 102 may, based on the network traffic, data determine one or more devices that are or were coupled to network 150. The devices are determined to be coupled to network 150, based on the network traffic, may include one or devices that were short-lived or active only for a short period of time. For example, monitoring device 102 may determine that a device was active on network 150 based on finding network traffic associated with a media access control (MAC) address, a dynamic host control protocol (DHCP) request or communications (e.g., a DHCP discover request), an IP address associated with the device (e.g., releasing an IP address), DNS entries or calls, communications to start, wake, or initialize a virtual machine, keep alive communications from a load balancer, etc.

Monitoring device 102 may determine which devices of network 150 were short lived or non-active at the time device data was received from network 150 based on comparing the device data received to the network traffic data. For example, a virtual machine management system (not shown) of network 150 may report that devices 152-156 are active but based on analyzing network traffic data from network 150, monitoring device 102 may determine that another device (not shown) was previously active on network 150.

Monitoring device 102 may further determine which devices are new based on network traffic data and the device data of active machines. For example, a device may have been started since the last time device data of active machines was received and therefore is not present in the active device data. Analysis of the traffic data by monitoring device 102 can be used to determine that a new device has started and is active since the last time the device data was received.

Monitoring device 102 may further be able to provide audit information. For example, a device management system (not shown) of network 150 may be used to generate a bill based on using four virtual machines but when queried the device management system of network 150 reports that devices 152-156 are active. Monitoring device 102 may be used to determine that a short lived virtual machine (not shown) was active during the billing period on network 150 and therefore the bill based on using four virtual machines is correct.

Monitoring device 102 may further be operable for detecting and identifying suspicious devices. For example, a device of network 150 may operate for short periods of time in order to avoid detection or identification as an active device by a device management system of network 150. The device that operates for short periods could be part of a botnet configured to check for a signal to launch a distributed denial of service (DDOS) attack. Based on traffic data analysis, monitoring device 102 can determine that the device is suspicious, malicious, or poorly configured (e.g., allowing external communication or control) due to initiating network traffic during relatively short periods of time but not presently active during one or more reports of active devices from a device management system of network 150.

Monitoring device 102 may further initiate one or more actions based on determining one or more short-lived or non-active devices. The actions may be based on a policy that details which actions are to be taken under which circumstances or conditions. The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket), and logging actions (e.g., recording information about the non-active device).

Figure 2:
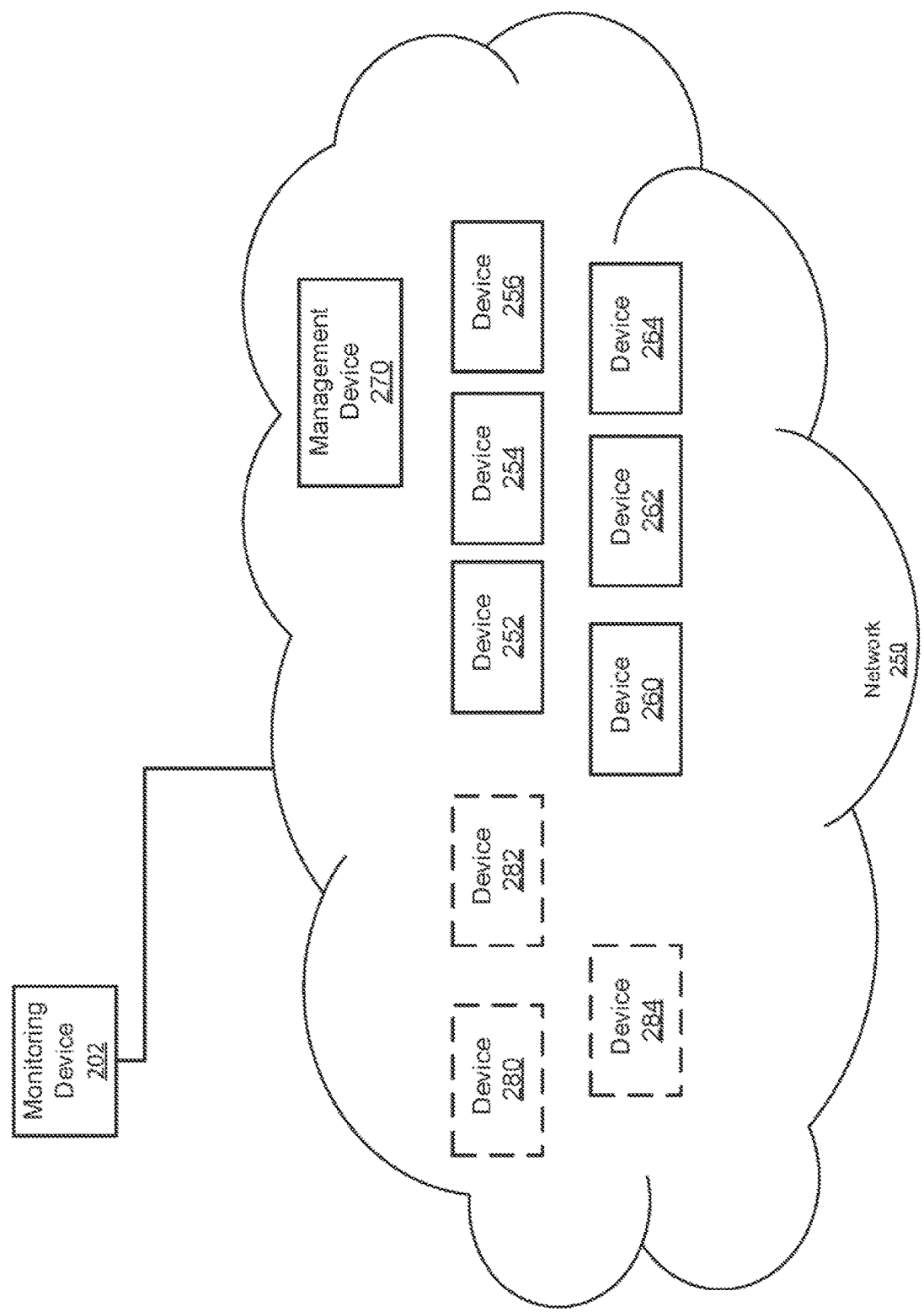
FIG. 2 depicts a diagram of a monitoring device having partial information about the devices of network in accordance with one implementation of the present disclosure.

FIG. 2 depicts a diagram of a monitoring device having partial information about the devices of network in accordance with one implementation of the present disclosure. Diagram 200 shows a monitoring device 202 (e.g., monitoring device 102) communicatively coupled to a network 250 (e.g., network 150).

Network 250 includes active devices 252-264, non-active device 280-284, and management device 270. Network 250 may be a cloud computing network. Network 250 may be substantially similar to network 150. In one embodiment, the devices 252-264 and 280-284 are virtual machines and the management device 270 is virtual machine management device. Management device 270 may be operable to monitor network 250 for active devices (e.g., devices 252-264), among other functions, including billing for usage of resources (e.g., devices) of network 250. Management device 270 may thus be limited to being able to report (e.g., in response to a request or a time interval driven event) to monitoring device 202 the active devices of network 250. In other words, management device 270 may not be aware of the non-active devices 280-284. The devices 280-284 may not be active or no longer active at the time management device 270 sends active device data to monitoring device 202.

The number of requests or number of times management device 270 can report active devices on the network 250 may be limited, cost money, or a combination thereof. For example, the company operating network 250 may put a limit on the number of requests that can be made to management device 270 in a period of time (e.g., 24 hours) and charge 1 cent for each request. Such attributes can thus make querying the management device 270 frequently to monitoring active devices in the network 250 very difficult or unfeasible thereby resulting in the active device data being sent very infrequently and not including information on devices 280-284.

The devices 280-284 may be hidden, offline, or released (e.g., virtual machines with their resources released). The sending of active device data by management device 270 thus does not include information for non-active devices 280-284 (as indicated by the dashed outlines).

Management device 270 may further be configured to monitor or log network traffic of devices of network 250 in any manner. For example, the NetFlow protocol may be used. Management device 270 may store logs of network traffic of network 250 including incremental logs.

Figure 3:
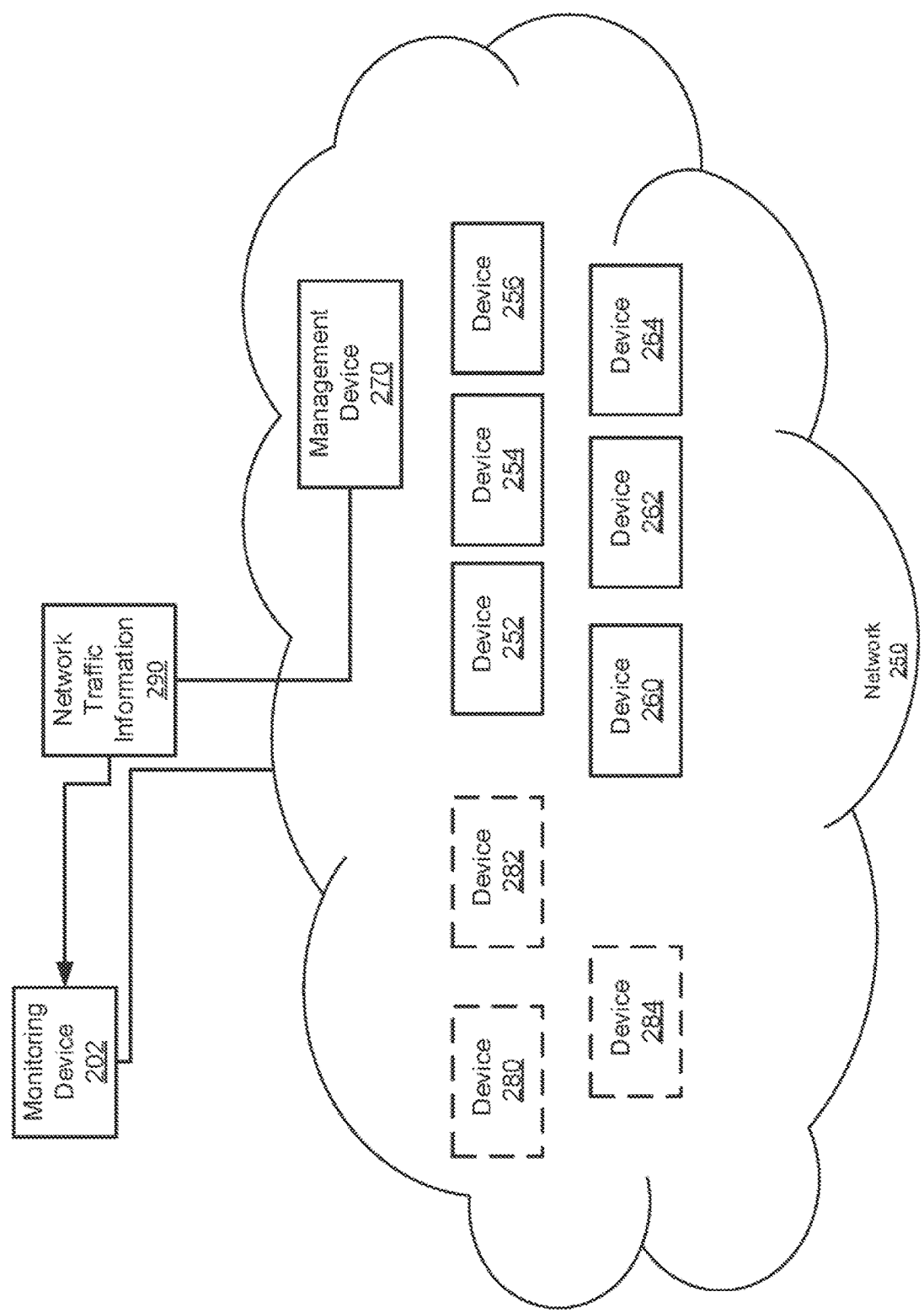
FIG. 3 depicts a diagram of a monitoring device receiving network traffic information in accordance with one implementation of the present disclosure.

FIG. 3 depicts a diagram of a monitoring device receiving network traffic information in accordance with one implementation of the present disclosure. FIG. 3 shows the management device 270 sending network traffic information 290 to monitoring device 202 (e.g., monitoring device 102). The network traffic information 290 may be sent from management device 270 in response to a request (e.g., via an API) from monitoring device 202 or may be sent from management device 270 in response to an event (e.g., a time interval expiring). The network traffic information 290 may be sent to the monitoring device 202 in between requests for active device information. The network traffic information 290 may also be incremental network traffic data that includes network traffic data since the last time network traffic data was sent to monitoring device 202. For example, the network information 290 may reflect each event that has happened since the last query. This also can conserve bandwidth as well as reduce costs if network 250 charges based on bandwidth usage. The requesting or sending of the network traffic information may be a configurable option on monitoring device 202 or management device 270. For example, the requesting of network traffic information 290 by monitoring device 202 may be configurable on an hourly basis by a user.

Figure 4:
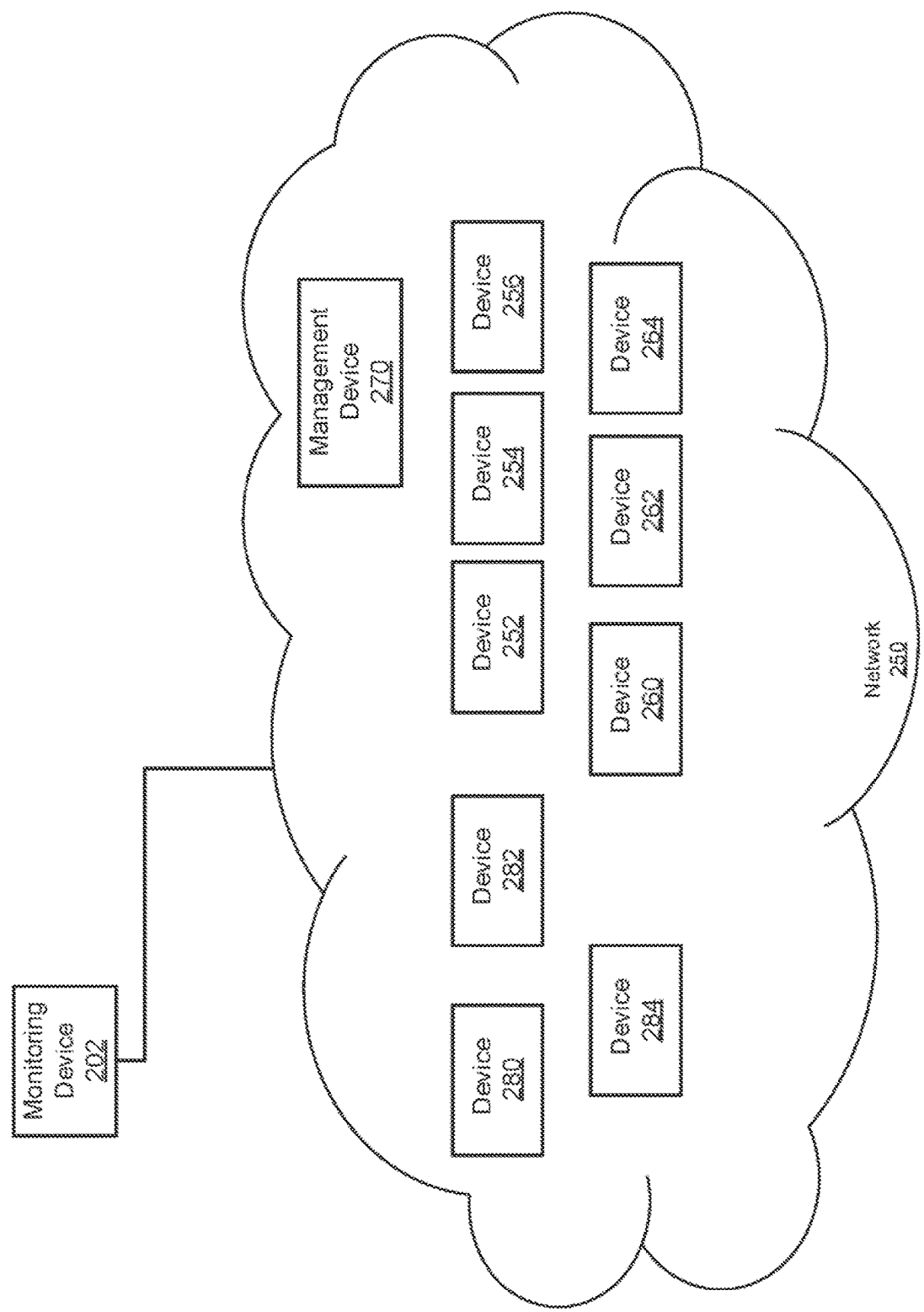
FIG. 4 depicts a diagram of a monitoring device determining a set of devices of a network in accordance with one implementation of the present disclosure.

FIG. 4 depicts a diagram of a monitoring device determining a set of devices of a network in accordance with one implementation of the present disclosure. Based on receiving network traffic information 290, monitoring device 202 can determine that nine devices including devices 280-284 were active based on devices 252-264 and 280-284 sending network traffic. Monitoring device 202 can further compare the network traffic information 290 to active device information from management device 270 to determine that devices 280-284 were short-lived or are now non-active. If monitoring device 202 is configured to report or display data devices 280-284 may be indicated as short lived instances, non-active devices, offline, terminated (e.g., for virtual machines which have resources that have been released), or otherwise unknown to management device 270 (e.g., devices that are rogue or hidden from management device 270).

Figure 5:
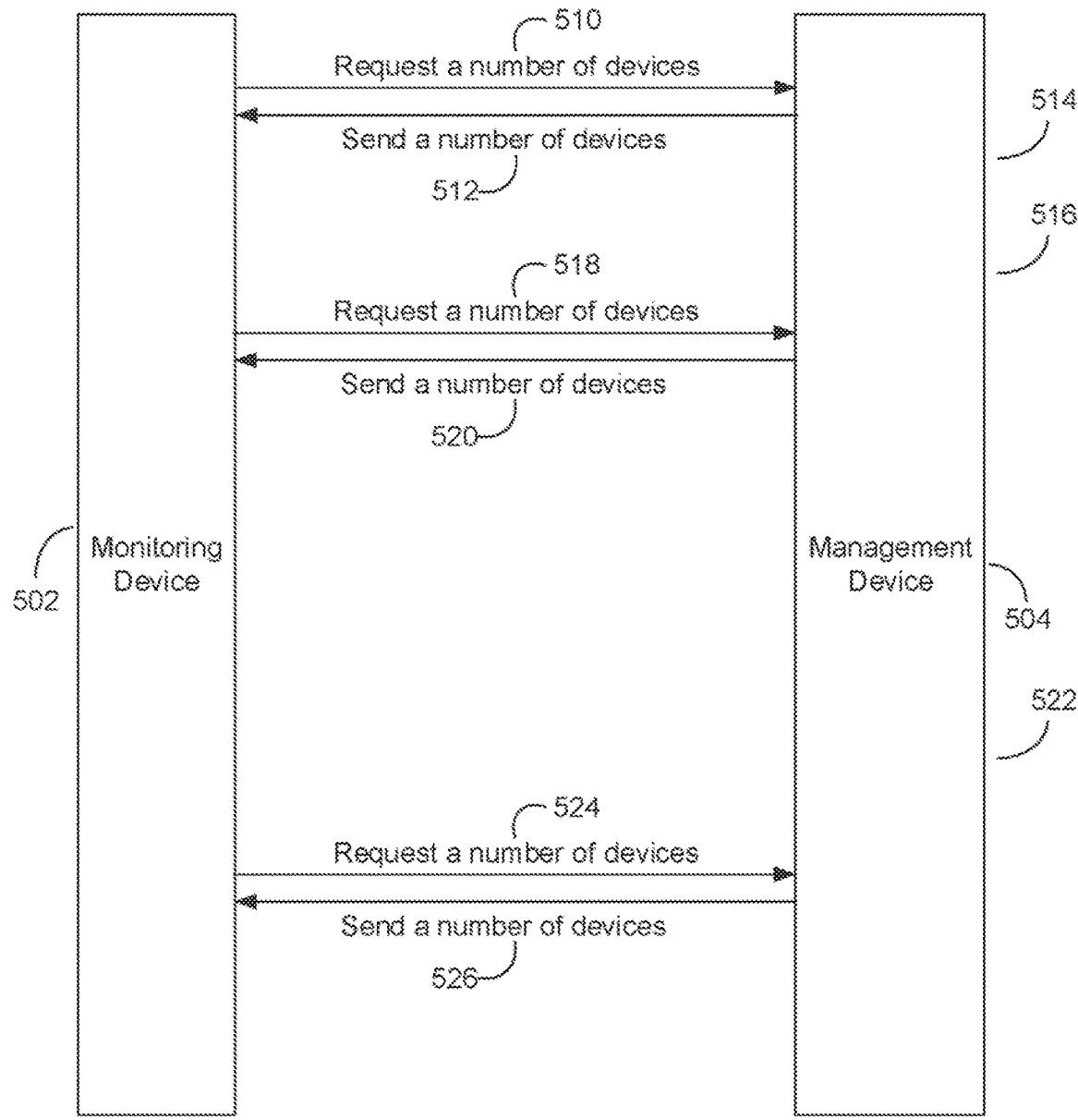
FIG. 5 depicts a diagram of a communication sequence of requesting device information associated with a network in accordance with one implementation of the present disclosure.
Figure 6:
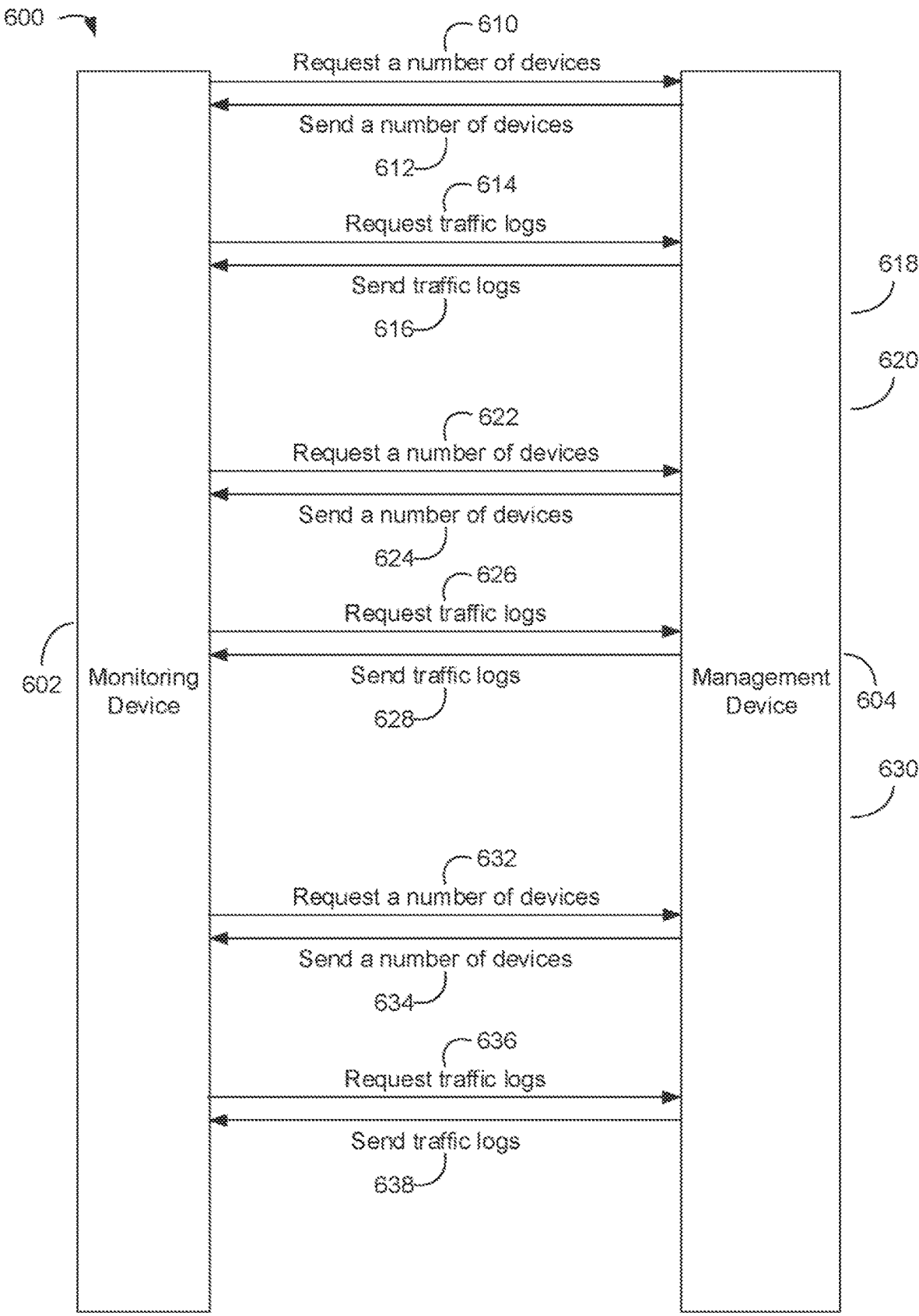
FIG. 6 depicts a diagram of a communication sequence for determining devices of a network in accordance with one implementation of the present disclosure.

Regarding FIGS. 5-6, in some embodiments, the sending of a number of devices or traffic logs may be in response to request or in response to an event occurring (e.g., a time interval event), as described herein. The requests depicted in FIGS. 5-6 are examples.

FIG. 5 depicts a diagram of a communication sequence of requesting device information associated with a network in accordance with one implementation of the present disclosure. FIG. 5 shows example communications between a monitoring device 502 (e.g., monitoring device 102) and a management device 504 (e.g., management device 270). Management device 504 may be configured to monitor active devices of a cloud computing network (e.g., network 250) or other network (e.g., a remote network 150). FIG. 5 shows that a device can go online (at time 514) and offline (at time 516) and will not be reported in response to a request for a number of devices.

At time 510, monitoring device 502 sends a request for a number of devices to management device 504. This can be a request for a number of devices that management device 504 has information associated therewith (e.g., active devices 252-264).

At time 512, management device 504 sends a number of devices to monitoring device 502.

At time 514, a device A (e.g., a virtual machine) (not shown) may be started or goes online and runs for a short period of time.

At time 516, the device A is stopped or goes offline. For example, if the device is a virtual machine, the virtual machine may be terminated and the associated resources released.

At time 518, monitoring device 502 sends a request for a number of devices to management device 504.

At time 520, management device 504 sends a number of devices to monitoring device 502. The number of devices does not include the device A that went online at time 514 and offline at time 516 due to it being not being online or running when the request for a number of device was made at time 518.

At time 522, a device B (e.g., virtual machine) (not shown) may be started or goes online and continues to run.

At time 524, monitoring device 502 sends a request for a number of devices to management device 504.

At time 526, management device 504 sends a number of devices to monitoring device 502. The number of devices includes the device that went online at time 522 due to it being online when the request for a number of devices was made at time 524.

FIG. 6 depicts a diagram of a communication sequence for determining devices of a network in accordance with one implementation of the present disclosure. FIG. 6 shows example communications between a monitoring device 602 (e.g., monitoring device 102) and a management device 604 (e.g., management device 270). Management device 604 may be configured to monitor active devices of a cloud computing network (e.g., network 250) or other network (e.g., a remote network 150). FIG. 6 shows that a device can go online (at time 618) and offline (at time 620) and will not be reported in response to a request for a number of devices but can be discovered or identified based on traffic logs (e.g., network traffic information 290). In some causes if the management device 604 does not report an accurate number of devices (e.g., due to a bug, due to being compromised, or due to one or more devices being inactive), the analysis of the traffic information allows for compensation of deficiencies in the number of devices reported by the management device 604.

The requests or receiving of the number of devices and the traffic data can be independent. For example, a request for traffic data may be performed in between requests for numbers of devices. The order of the requests for numbers of devices and requests for traffic data may be a configurable (e.g., user configurable) option.

At time 610, monitoring device 602 sends a request for a number of devices to management device 604. This can be a request for a number of devices that management device 604 has information on (e.g., active devices 252-264).

At time 612, management device 604 sends a number of devices to monitoring device 602.

At time 614, monitoring device 602 sends a request for traffic logs to management device 604. This can be a request for traffic logs of network traffic captured on a network (e.g., network 150) associated with management device 604.

At time 616, management device 604 sends traffic logs to monitoring device 602. Monitoring device 602 can then determine a number of devices that have been active on the network associated with or communicatively coupled to management device 604.

At time 618, a device C (e.g., a virtual machine) (not shown) may be started or goes online and runs for a short period of time.

At time 620, the device C is stopped or goes offline. For example, if the device is a virtual machine, the virtual machine may be terminated and the resource released.

At time 622, monitoring device 602 sends a request for a number of devices to management device 604. This can be a request for a number of devices that management device 604 has information on (e.g., active devices 252-264).

At time 624, management device 604 sends a number of devices to monitoring device 602. Monitoring device 602 can then compare the number of devices received to the previously received number of devices (e.g., at time 612) and determine whether there are any new (or more) devices on the network associated or communicatively coupled to management device 604.

At time 626, monitoring device 602 sends a request for traffic logs to management device 604. This can be a request for incremental traffic logs of network traffic captured on the network (e.g., network 150) associated with the management device 604 since the request at time 614.

At time 628, management device 604 sends traffic logs to monitoring device 602. Monitoring device 602 can then determine a number of devices that have been active or were active on a network associated with or communicatively coupled to management device 604. This can include active devices (e.g., devices 252-264) and non-active devices (e.g., devices 280-284). In particular, this includes device C which can be identified based on traffic created by device C or traffic sent to device C that is indicated in the traffic logs. For example, the traffic sent to device C could include traffic that is in response to a previous request made by device C or control traffic from management device 604 that would turn on device C.

At time 630, a device D (e.g., virtual machine) (not shown) may be started or goes online and continues to run.

At time 632, monitoring device 602 sends a request for a number of devices to management device 604.

At time 634, management device 604 sends a number of devices to monitoring device 602. The number of devices includes the device D that went online at time 630 due to it being online when the request for a number of devices was made at time 632.

At time 636, monitoring device 602 sends a request for traffic logs to management device 604. This can be a request for incremental traffic logs.

At time 638, management device 604 sends traffic logs to monitoring device 602. Monitoring device 602 can then determine a number of devices that have been active on a network associated with or communicatively coupled to management device 604 based on the traffic logs (e.g., including the device D that came online at time 630). This can include active devices (e.g., devices 252-264) and non-active devices (e.g., devices 280-284).

With reference to FIGS. 7-10, flowcharts 700-1000 illustrate example functions used by various embodiments. Although specific function blocks ("blocks") are disclosed in flowcharts 700-1000, such steps are examples. That is, embodiments are well suited to performing various other blocks or variations of the blocks recited in flowcharts 700-1000. It is appreciated that the blocks in flowcharts 700-1000 may be performed in an order different than presented, and that not all of the blocks in flowcharts 700-1000 may be performed.

Figure 7:
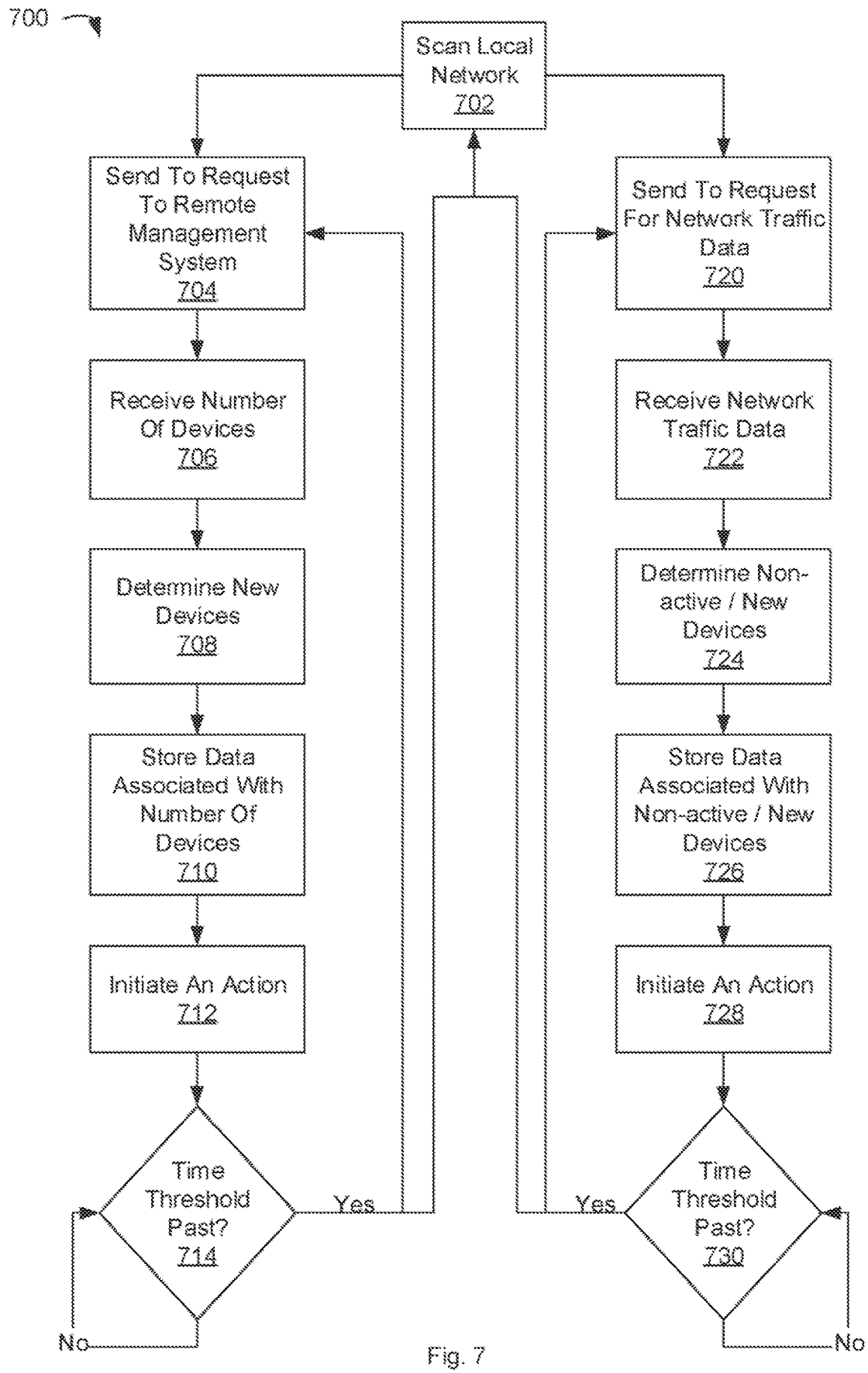
FIG. 7 depicts a flow diagram of aspects of a method for monitoring devices on a network based on requesting device information and requesting network traffic information in accordance with one implementation of the present disclosure.

FIG. 7 depicts a flow diagram of aspects of a method for monitoring devices on a network based on requesting device information and requesting network traffic information in accordance with one implementation of the present disclosure. The flow chart 700 of FIG. 7 may be performed by monitoring device 102 or any system configured to monitor one or more networks for devices.

At block 702, a scan of a local network is performed. The scan of the local network (e.g., network 100) may be performed prior to gathering data on a remote network (e.g., network 150). The scan of the local network may be performed as part of a network access control (NAC) function of a device (e.g., monitoring device 102).

At block 704, a request to a remote management system (e.g., management device 270 or management device 604) is sent. The request may be for device information including a number of devices on the remote network (e.g., a cloud, a remote server, one or more hypervisors, a network being monitored by a network access control (NAC) device, etc.).

At block 706, a number of devices is received. The remote management system may send a number of active devices on the remote network. The number of devices may represent a number of physical devices and virtual machines, as described herein. The number of devices may be received along with additional device information that can be used to identify one or more devices.

At block 708, new devices are determined. The new devices may be determined based on comparing a previous number of devices or sets of devices with the number of devices or sets of devices received (e.g., block 706).

At block 710, data associated with the number of devices is stored. The data associated with the number of devices may include a number of new devices identified (e.g., block 708), device identification information, or a combination thereof. The data may also be displayed in a list of devices (e.g., as part of a graphical user interface (GUI)).

At block 712, an action is optionally initiated. One or more actions may optionally be performed based on the number of devices or the one or more new devices identified. The actions may include remediation actions, logging information, or information actions. The remediation actions can include signaling a patching service or system (e.g., on the network or on the device), signaling an update service or system (e.g., on the network or on the device), changing the network access of a device (e.g., changing the virtual local area network (VLAN)), block a device from being started or spun-up, and sending a notification (e.g., an email or creating an information technology (IT) ticket). The logging information can include logging the number of devices, number of new devices, device identification information, or a combination thereof. The information actions can include sending an email or creating an IT ticket based on the number of devices, the number of new devices, or a combination thereof.

At block 714, whether a time threshold has past is determined. The time threshold may be based on a configurable time interval for requesting a number of devices from a management device (e.g., management device 270 or management device 604). If the time threshold has past, block 702 or block 704 may be performed. If the time threshold has not past, block 714 may be performed.

At block 720, a request for network traffic data is sent. The request for network traffic data may be sent to a remote management system or device (e.g., management device 270 or management device 604) or other network device, as described herein.

At block 722, network traffic data is received. The network traffic data may be received from a remote management system or device (e.g., management device 270 or management device 604) or other network device, as described herein.

At block 724, non-active devices or new devices are determined. The new devices may include devices that were not known based on information received from the remote management system (e.g., management device 270 or management device 604). This can include one or more rogue devices that are configured for or take action to avoid detection by the remote management system or one or more devices that are not known to the remote management system. The non-active devices or new devices may be determined based on comparing the network traffic data to a number of device received (e.g., block 706), as described herein. The non-active devices may further be determined based on the length of a period that a device generated traffic. For example, if a device generated traffic for five minutes during a thirty minute period at the beginning an eight hour period, the device may be considered non-active.

At block 726, data associated with the non-active devices or new device is stored. The data may be stored to be used in tracking devices on the remote network. The data may also be displayed in a list of active and non-active devices (e.g., in a GUI).

At block 728, an action is optionally initiated, as described herein. For example, an action may be initiated to provide a notification of the one or more non-active devices, one or more new devices, or a combination thereof, identified on the remote network.

At block 730, whether a time threshold has past is determined. The time threshold may be based on a configurable time interval for requesting network traffic data. If the time threshold has past, block 702 or block 720 may be performed. If the time threshold has not past, block 730 may be performed. Blocks 714 and 730 may each be associated with respective time thresholds (e.g., intervals) that may be independently configurable.

Figure 8:
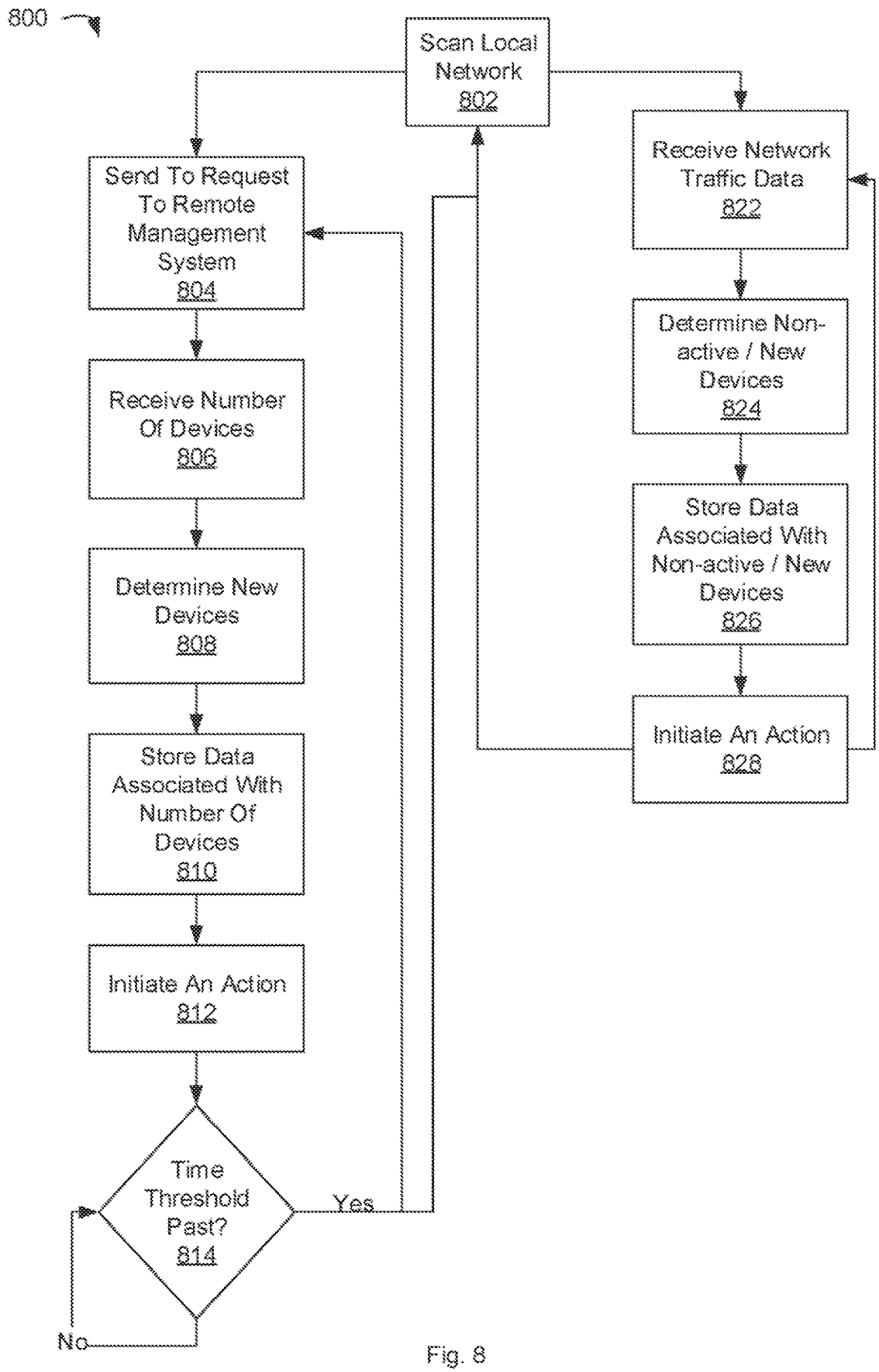
FIG. 8 depicts a flow diagram of aspects of a method for monitoring devices on a network based on requesting device information and receiving network traffic information in accordance with one implementation of the present disclosure.

FIG. 8 depicts a flow diagram of aspects of a method for monitoring devices on a network based on requesting device information and receiving network traffic information in accordance with one implementation of the present disclosure. The flow chart 800 of FIG. 8 may be performed by monitoring device 102 or any system configured to monitor one or more networks for devices.

At block 804, a request to a remote management system (e.g., management device 270 or management device 604) is sent. The request may be for device information including a number of devices on the remote network (e.g., a cloud, a remote server, one or more hypervisors, a network being monitored by a network access control (NAC) device, etc.).

At block 806, a number of devices is received. The remote management system may send a number of active devices on the remote network. The number of devices may represent a number of physical devices and virtual machines, as described herein. The number of devices may be received along with additional device information that can be used to identify one or more devices.

At block 808, new devices are determined. The new devices may be determined based on comparing a previous number of devices or sets of devices with the number of devices or sets of devices received (e.g., block 806).

At block 810, data associated with the number of devices is stored. The data associated with the number of devices may include a number of new devices identified (e.g., block 808), device identification information, or a combination thereof. The data may also be displayed in a list of devices (e.g., as part of a GUI).

At block 812, an action is optionally initiated, as described herein.

At block 814, whether a time threshold has past is determined. The time threshold may be based on a configurable time interval for requesting a number of devices from a management device (e.g., management device 270 or management device 604). If the time threshold has past, block 802 or block 804 may be performed. If the time threshold has not past, block 814 may be performed.

At block 822, network traffic data is received. The network traffic data may be received from a remote management system or device (e.g., management device 270 or management device 604) or other network device, as described herein.

At block 824, non-active devices or new devices are determined. The new devices may include devices that were not known based on information received from the remote management system (e.g., management device 270 or management device 604). This can include one or more rogue devices that are configured for or take action to avoid detection by the remote management system or one or more devices that are not known to the remote management system. The non-active devices or new devices may be determined based on comparing the network traffic data to number of device received (e.g., block 806), as described herein. The non-active devices may further be determined based on the length of a period that a device generated traffic. For example, if a device generated traffic for five minutes during a thirty minute period at the beginning an eight hour period, the device may be considered non-active.

At block 826, data associated with the non-active devices or new device is stored. The data may be stored to be used in tracking devices on the remote network (e.g., in a GUI).

At block 828, an action is optionally initiated, as described herein. For example, an action may be initiated to provide a notification of the one or more non-active devices, one or more new devices, or a combination thereof, identified on the remote network. Block 802 or block 822 may optionally then be performed.

Figure 9:
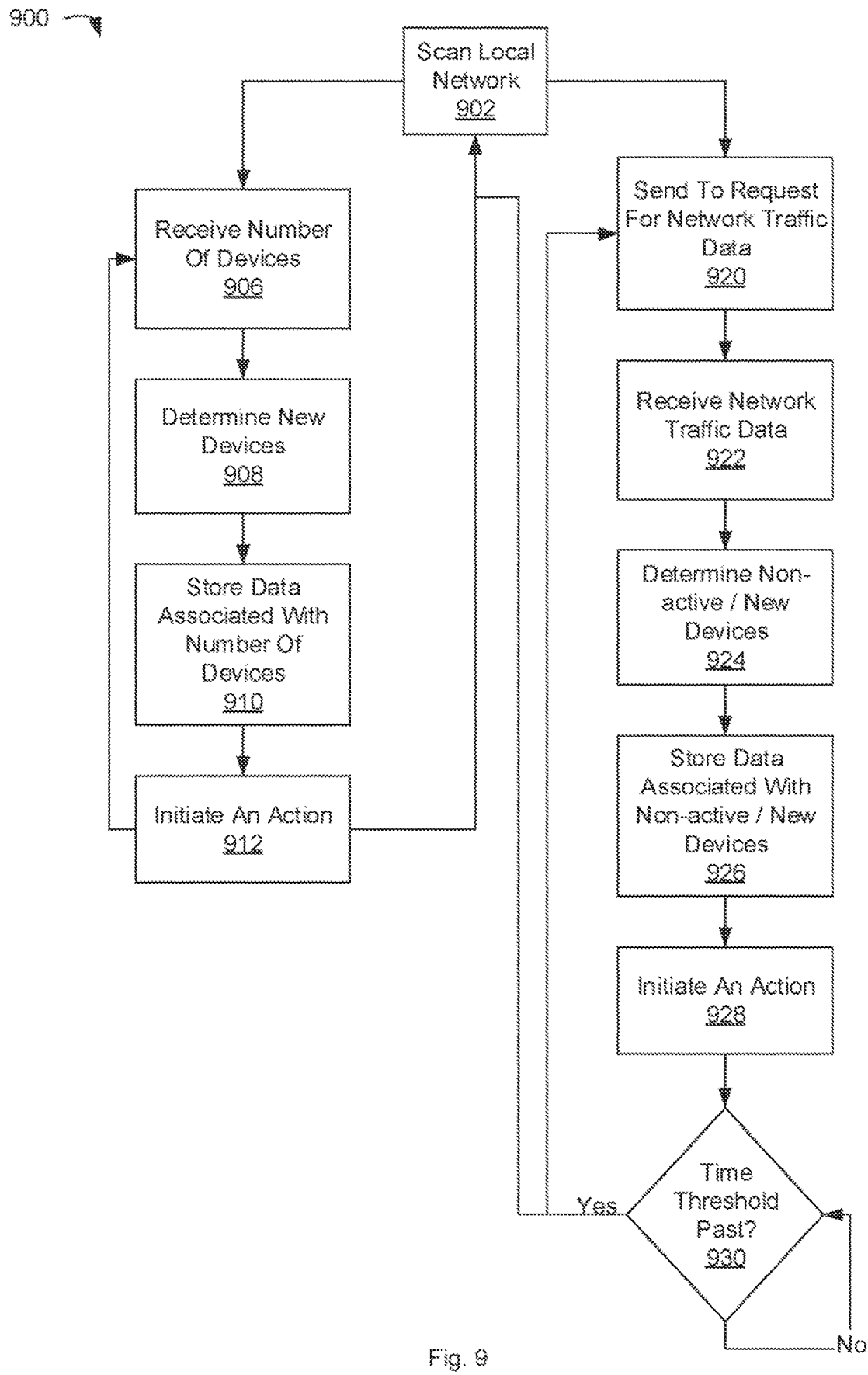
FIG. 9 depicts a flow diagram of aspects of a method for monitoring devices on a network based on receiving device information and requesting network traffic information in accordance with one implementation of the present disclosure.

FIG. 9 depicts a flow diagram of aspects of a method for monitoring devices on a network based on receiving device information and requesting network traffic information in accordance with one implementation of the present disclosure. The flow chart 900 of FIG. 9 may be performed by monitoring device 102 or any system configured to monitor one or more networks for devices.

At block 906, a number of devices is received. The remote management system may send a number of active devices on the remote network. The number of devices may represent a number of physical devices and virtual machines, as described herein. The number of devices may be received along with additional device information that can be used to identify one or more devices.

At block 908, new devices are determined. The new devices may be determined based on comparing a previous number of devices or sets of devices with the number of devices or sets of devices received (e.g., block 906).

At block 910, data associated with the number of devices is stored. The data associated with the number of devices may include a number of new devices identified (e.g., block 908), device identification information, or a combination thereof. The data may also be displayed in a list of devices (e.g., as part of a GUI).

At block 912, an action is optionally initiated, as described herein. Block 902 or block 906 may optionally then be performed.

At block 920, a request for network traffic data is sent. The request for network traffic data may be sent to a remote management system or device (e.g., management device 270 or management device 604) or other network device, as described herein.

At block 922, network traffic data is received. The network traffic data may be received from a remote management system or device (e.g., management device 270 or management device 604) or other network device, as described herein.

At block 924, non-active devices or new devices are determined. The new devices may include devices that were not known based on information received from the remote management system (e.g., management device 270 or management device 604). This can include one or more rogue devices that are configured for or take action to avoid detection by the remote management system or one or more devices that are not known to the remote management system. The non-active devices or new devices may be determined based on comparing the network traffic data to number of device received (e.g., block 906), as described herein. The non-active devices may further be determined based on the length of a period that a device generated traffic. For example, if a device generated traffic for five minutes during a thirty minute period at the beginning an eight hour period, the device may be considered non-active.

At block 926, data associated with the non-active devices or new device is stored. The data may be stored to be used in tracking devices on the remote network (e.g., in a GUI).

At block 928, an action is optionally initiated, as described herein. For example, an action may be initiated to provide a notification of the one or more non-active devices, one or more new devices, or a combination thereof, identified on the remote network.

At block 930, whether a time threshold has past is determined. The time threshold may be based on a configurable time interval for requesting network traffic data. If the time threshold has past, block 902 or block 920 may be performed. If the time threshold has not past, block 930 may be performed. Blocks 914 and 930 may each be associated with respective time thresholds (e.g., intervals) that may be independently configurable.

Figure 10:
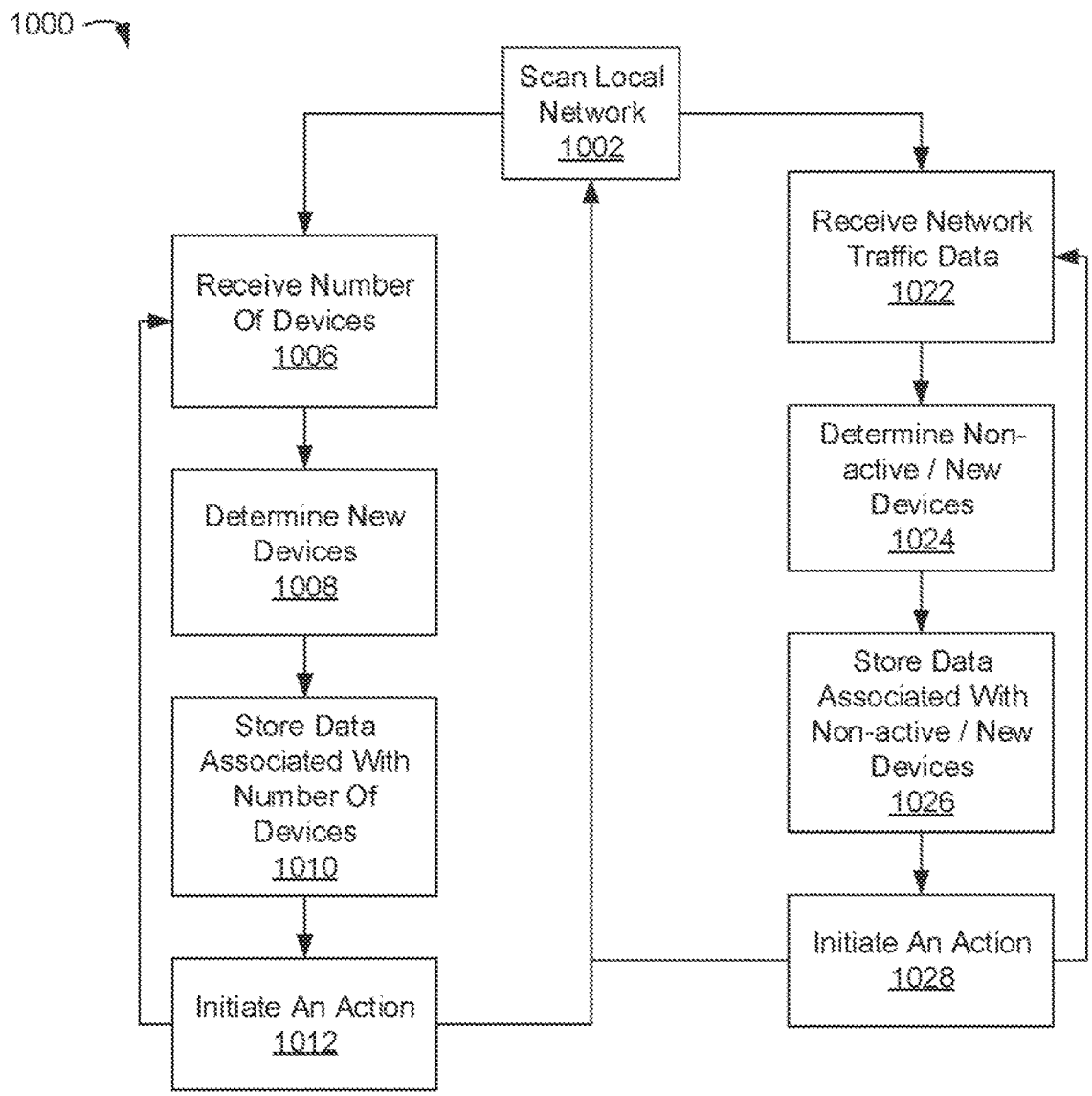
FIG. 10 depicts a flow diagram of aspects of a method for monitoring devices on a network based on receiving device information and receiving network traffic information in accordance with one implementation of the present disclosure.

FIG. 10 depicts a flow diagram of aspects of a method for monitoring devices on a network based on receiving device information and receiving network traffic information in accordance with one implementation of the present disclosure. The flow chart 1000 of FIG. 10 may be performed by monitoring device 102 or any system configured to monitor one or more networks for devices.

At block 1006, a number of devices is received. The remote management system may send a number of active devices on the remote network. The number of devices may represent a number of physical devices and virtual machines, as described herein. The number of devices may be received along with additional device information that can be used to identify one or more devices.

At block 1008, new devices are determined. The new devices may be determined based on comparing a previous number of devices or sets of devices with the number of devices or sets of devices received (e.g., block 1006).

At block 1010, data associated with the number of devices is stored. The data associated with the number of devices may include a number of new devices identified (e.g., block 1008), device identification information, or a combination thereof. The data may also be displayed in a list of devices (e.g., as part of a GUI).

At block 1012, an action is optionally initiated, as described herein. Block 1002 or block 1006 may then optionally be performed.

At block 1022, network traffic data is received. The network traffic data may be received from a remote management system or device (e.g., management device 270 or management device 604) or other network device, as described herein.

At block 1024, non-active devices or new devices are determined. The new devices may include devices that were not known based on information received from the remote management system (e.g., management device 270 or management device 604). This can include one or more rogue devices that are configured for or take action to avoid detection by the remote management system or one or more devices that are not known to the remote management system. The non-active devices or new devices may be determined based on comparing the network traffic data to number of device received (e.g., block 1006), as described herein. The non-active devices may further be determined based on the length of a period that a device generated traffic. For example, if a device generated traffic for five minutes during a thirty minute period at the beginning an eight hour period, the device may be considered non-active.

At block 1026, data associated with the non-active devices or new device is stored. The data may be stored to be used in tracking devices on the remote network (e.g., in a GUI).

At block 1028, an action is optionally initiated, as described herein. For example, an action may be initiated to provide a notification of the one or more non-active devices, one or more new devices, or a combination thereof, identified on the remote network. Block 1002 or block 1022 may then optionally be performed.

Figure 11:
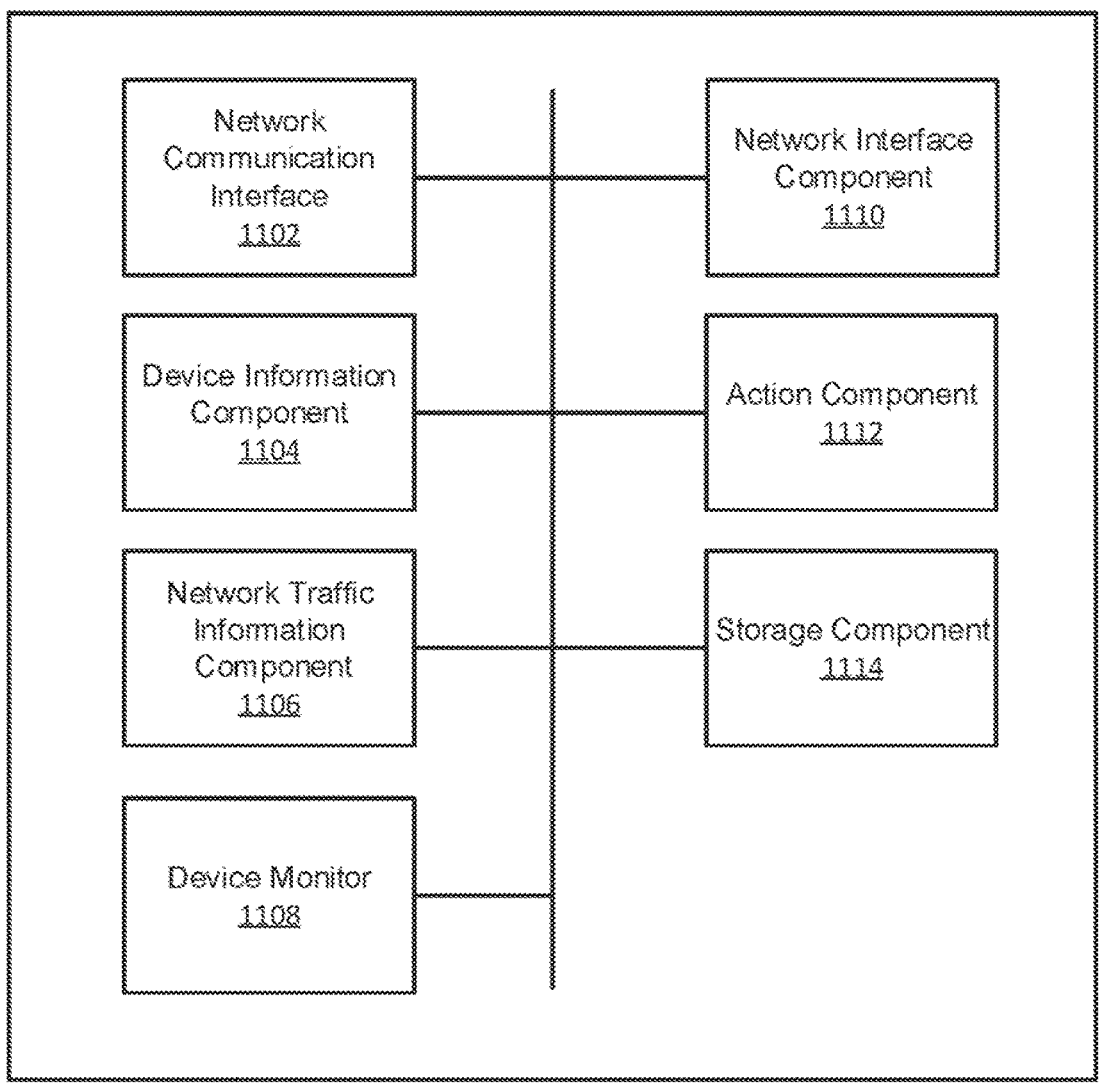
FIG. 11 depicts illustrative components of a system for device monitoring in accordance with one implementation of the present disclosure.

FIG. 11 illustrates example components used by various embodiments. Although specific components are disclosed in system 1100, it should be appreciated that such components are examples. That is, embodiments of the present invention are well suited to having various other components or variations of the components recited in system 1100. It is appreciated that the components in system 1100 may operate with other components than those presented, and that not all of the components of system 1100 may be required to achieve the goals of system 1100.

FIG. 11 depicts illustrative components of a system for device monitoring in accordance with one implementation of the present disclosure. FIG. 11 shows an example system 1100 including network communication interface 1102, a device information component 1104, a network traffic information component 1106, a device monitor 1108, a network interface component 1110, an action component 1112, and a storage component 1114. The components of system 1100 may be part of a computing system or other electronic device (e.g., monitoring device 102) or a virtual machine and be configured to monitor one or more devices communicatively coupled to one or more networks. For example, the system 1100 may further include a memory and a processing device, operatively coupled to the memory, which may perform the functions of or execute the components of system 1100. It is appreciated that the modular nature of system 1100 may allow the components to be independent and allow flexibility to enable or disable individual components or to extent/upgrade components without affecting other components thereby providing scalability and extensibility.

Network communication interface 1102 is configured to communicate with one or more devices (e.g., network device 104) coupled to one or more networks that are coupled to system 1100, communicate with devices on local and remote networks, and receive or access network traffic, as described herein.

Device information component 1104 is operable to receive device data (e.g., including a number of devices) associated with devices on of a remote network, as described herein. Network traffic information component 1106 is operable to receive network traffic data or information associated with device traffic on a remote network (e.g., from management device 270), as described herein.

Device monitor 1108 is operable to initiate requests for device data and network traffic data and further operable to analyze the device data and network traffic data to determine one or more new devices and one or more non-active devices of a network (e.g., network 150 or network 250), as described herein.

Network interface component 1110 is operable to send requests (e.g., via an API) from device monitor 1108 to an external, remote, or separate network (e.g., network 150 or network 250), as described herein.

Action component 1112 is operable to initiate an action (e.g., logging, notification, remediation, etc.) based on analysis by device monitor 1108, as described herein.

Storage component 1114 is configured to store device information (e.g., from management device 270 or management device 604) and store network traffic information (e.g., from management device 270 or management device 604), as described herein. The information may further be used for displaying a list of active and non-active devices of a network (e.g., network 150 or network 250) (e.g., in a GUI).

The system 1100 may be software stored on a non-transitory computer readable medium having instructions encoded thereon that, when executed by a processing device, cause the processing device to: send a request for network traffic data to a remote network and receive the network traffic data. The processing device is further to determine a set of one or more devices associated with the remote network based on the network traffic data. The one or more devices may comprise one or more active devices associated with the remote network and one or more non-active devices associated with the remote network.

The processing device is further to store the set of one or more devices associated with the remote network. The processing device is further to initiate an action based on the set of one or more devices associated with the remote network. The processing device is further to request device data associated with one or more devices coupled to a first network. The device data may comprise data of one or more active devices coupled to the first network at a first interval. The processing device is further to send the request for network traffic data at a second interval.

Figure 12:
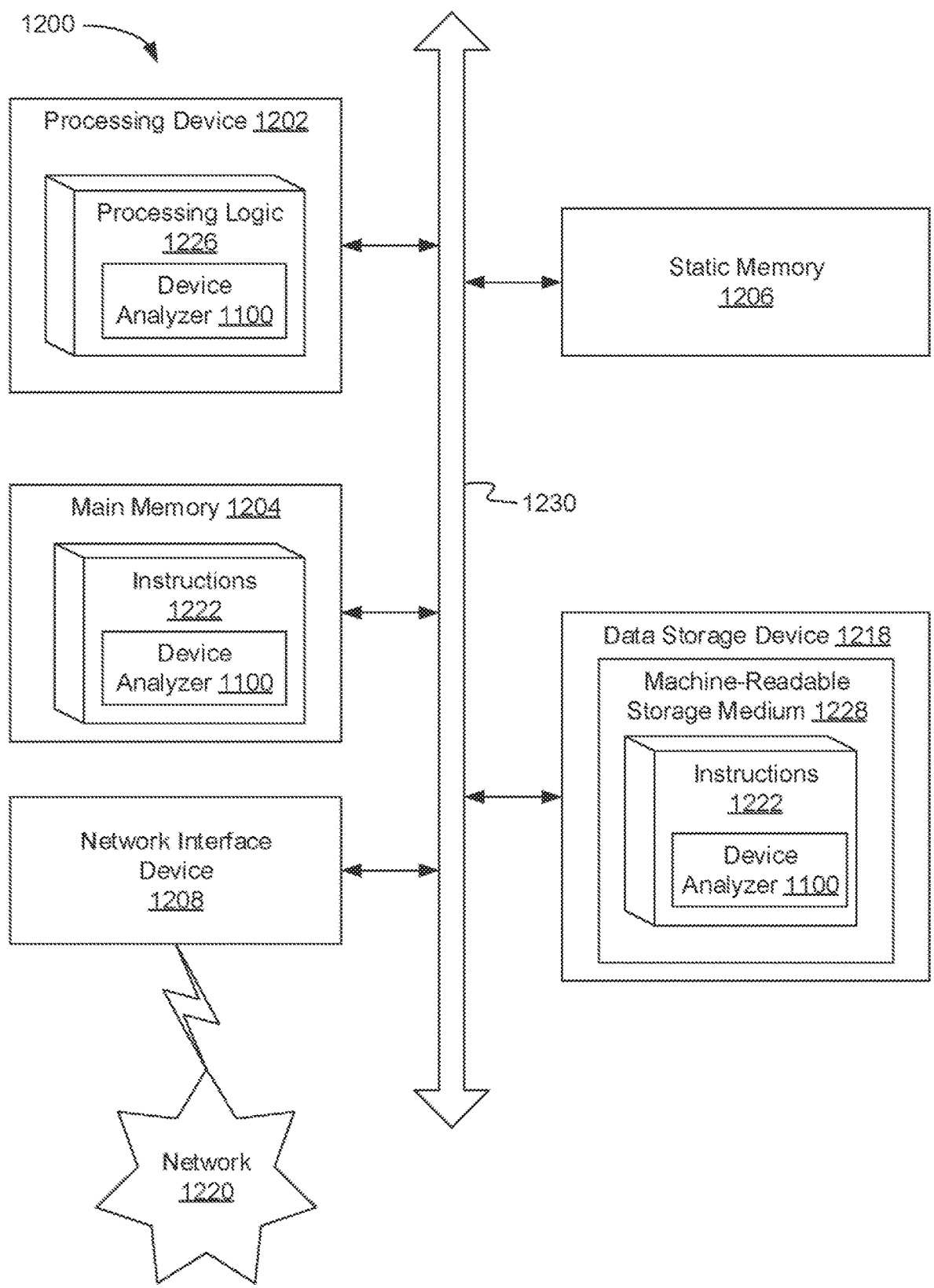
FIG. 12 is a block diagram illustrating an example computer system, in accordance with one implementation of the present disclosure.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may be representative of a server, such as monitoring device 102 configured to perform device monitoring or the functions of system 1100.

The exemplary computer system 1200 includes a processing device 1202, a main memory 1204 (e.g., read-only memory (ROM), flash memory, dynamic random access memory (DRAM), a static memory 1206 (e.g., flash memory, static random access memory (SRAM), etc.), and a data storage device 1218, which communicate with each other via a bus 1230. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute processing logic 1226, which may be one example of system 1100 shown in FIG. 11, for performing the operations and steps discussed herein.

The data storage device 1218 may include a machine-readable storage medium 1228, on which is stored one or more set of instructions 1222 (e.g., software) embodying any one or more of the methodologies of functions described herein, including instructions to cause the processing device 1202 to execute device analyzer 1100. The instructions 1222 may also reside, completely or at least partially, within the main memory 1204 or within the processing device 1202 during execution thereof by the computer system 1200; the main memory 1204 and the processing device 1202 also constituting machine-readable storage media. The instructions 1222 may further be transmitted or received over a network 1220 via the network interface device 1208.

The machine-readable storage medium 1228 may also be used to store instructions to perform a method for device monitoring, as described herein. While the machine-readable storage medium 1228 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary"

is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving network traffic data associated with a network;
receiving, from a source other than the network traffic data including a hypervisor, a network access control (NAC) system, or a cloud management system, an indication of one or more active devices coupled to the network at an end of a time interval;
comparing the indication of the one or more active devices coupled to the network at the end of the time interval to the network traffic data associated with the network; and
determining, by a processing device, based on the comparison between the indication of the one or more active devices and the network traffic data, one or more additional devices coupled to the network during the time interval wherein the one or more additional devices have a shorter period of network traffic activity than the one or more active devices coupled to the network and were not included in the indication of the one or more active devices coupled to the network at the end of the time interval.

2. The method of claim 1, wherein the network traffic data comprises incremental traffic logs associated with the network.

3. The method of claim 1, wherein the one or more active devices and the one or more additional devices each comprise a virtual machine on the network.

4. The method of claim 1, wherein the network is a cloud computing network.

5. The method of claim 1, wherein the one or more additional devices comprise an inactive device.

6. The method of claim 1, wherein the one or more additional devices comprise a compromised device.

7. The method of claim 1 further comprising:
storing the indication of the one or more active devices coupled to the network and the network traffic data indicating the one or more additional devices.

8. The method of claim 1 further comprising:
initiating an action based on the determining of the one or more additional devices.

9. The method of claim 1, further comprising: determining that one or more of the one or more active devices identified at the end of the time interval are no longer active based on the comparison of the indication of the one or more active devices with the network traffic data.

10. A system comprising:
a memory; and
a processing device, operatively coupled to the memory, to:
receive network traffic data associated with a network;
receive, from a source other than the network traffic data including a hypervisor, a network access control (NAC) system, or a cloud management system, an indication of one or more active devices coupled to the network at an end of a time interval; and
compare the indication of the one or more active devices coupled to the network at the end of the time interval to the network traffic data associated with the network; and
determine based on the comparison between the indication of the one or more active devices and the network traffic data, one or more additional devices coupled to the network during the time interval wherein the one or more additional devices have a shorter period of network traffic activity than the one or more active devices coupled to the network and were not included in the indication of the one or more active devices coupled to the network at the end of the time interval.

11. The system of claim 10, wherein the network traffic data comprises incremental traffic logs associated with the network.

12. The system of claim 11, wherein the one or more active devices and the one or more additional devices each comprise a virtual machine on the network.

13. The system of claim 10, wherein the processing device is further to:
store the indication of the one or more active devices coupled to the network and the network traffic data indicating the one or more additional devices.

14. The system of claim 10, wherein the processing device is further to:
initiate an action based on the determining of the one or more additional devices.

15. The system of claim 10, further comprising: determining that one or more of the one or more active devices identified at the end of the time interval are no longer active based on the comparison of the indication of the one or more active devices with the network traffic data.

16. A non-transitory computer readable medium having instructions encoded thereon that, when executed by a processing device, cause the processing device to:
receive network traffic data associated with a network;
receive, from a source other than the network traffic data including a hypervisor, a network access control (NAC) system, or a cloud management system, an indication of one or more active devices coupled to a network at an end of a time interval;
compare the indication of the one or more active devices coupled to the network at the end of the time interval to the network traffic data associated with the network; and
determine, by the processing device, based on the comparison between the indication of the one or more active devices and the network traffic data, one or more additional devices coupled to the network during the time interval wherein the one or more additional devices have a shorter period of network traffic activity than the one or more active devices coupled to the network and were not included in the indication of the one or more active devices coupled to the network at the end of the time interval.

17. The non-transitory computer readable medium of claim 16, wherein the network traffic data comprises incremental traffic logs associated with the network.

18. The non-transitory computer readable medium of claim 16, wherein the processing device is further to:
   store the indication of the one or more active devices coupled to the network and the network traffic data indicating the one or more additional devices.

19. The non-transitory computer readable medium of claim 16, wherein the processing device is further to:
   initiate an action based on the determining of the one or more additional devices.

20. The non-transitory computer readable medium of claim 16, further comprising: determining that one or more of the one or more active devices identified at the end of the time interval are no longer active based on the comparison of the indication of the one or more active devices with the network traffic data.

\* \* \* \* \*